Z. B. SIMS.
Draft Equalizer.
No. 94,355.
Patented Aug. 31, 1869.
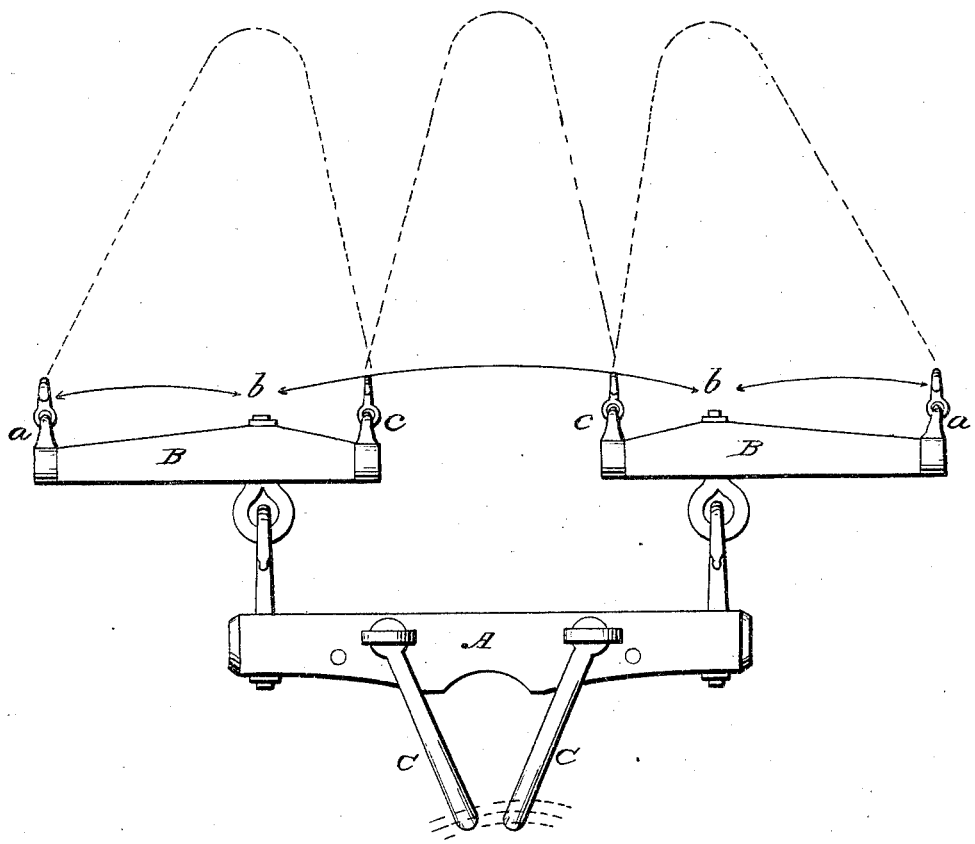

UNITED STATES PATENT OFFICE.

ZACHARIAH B. SIMS, OF BONHAM, TEXAS.

Letters Patent No. 94,355, dated August 31, 1869.

IMPROVEMENT IN THREE-HORSE EQUALIZERS.

The Schedule referred to in these Letters Patent and making part of the same.

*To all whom it may concern:*

Be it known that I, ZACHARIAH B. SIMS, of Bonham, in the county of Fannin, and State of Texas, have invented a new and useful Improvement in Treble-Trees; and I do declare the following to be a full, clear, and exact description of the same, sufficient to enable others skilled in the art to which my invention appertains, to make and use the same, reference being had to the accompanying drawing, forming part of this specification, in which—

The figure is a top or plan view, with the parts in position.

My invention is a device for equalizing the draught of three horses on two single-trees, and consists in jointing the latter eccentrically to the former.

It also consists in arranging two stretcher-loops eccentrically on the double-tree, whereby results and advantages are gained, as will be hereinafter more fully described.

In the drawings—

A represents the double-tree, to which the single-trees B are connected by hooks and eyes, or equivalent devices, as ordinarily.

The connecting-hook or eye of each single-tree is placed at a point between one side and the centre, so that the tree is divided into two unequal parts, respectively one-third and two-thirds its length.

The trees are placed in position as shown in the drawings; that is, with the short sides toward each other.

It will be seen that the length from $a$ to $b$ is two-thirds of the whole tree, and, consequently, $b$ to $c$ one-third, so that there is a leverage of four-thirds against two-thirds.

But this inequality is overcome by the inner traces of the outer horses being hitched at $c$, where the traces of the middle horse are likewise hitched, whereby $b\ c\ b\ c$ become equal to $a\ b\ a\ b$, and an equalization in draught is the result.

C are stretcher-loops, by which the double-tree is connected to a clevis, wagon, or other place of need.

These loops are jointed to the tree at points on each side of the centre, so that the strain is not at one point, but somewhat distributed.

I provide means of adjustment for the loops, so that should there be any material inequality in the strength of the three horses, I can equalize by arranging the loops accordingly nearer to or further away from the centre on either one or both sides.

Suitable clips, bolts, and the like appurtenances are applied as usual, for attachment-purposes.

Having thus fully described my invention,

What I claim as new, and desire to secure by Letters Patent, is—

The single-trees B B, jointed eccentrically to the double-tree A, the latter being provided with the stretcher-loops C C, arranged eccentrically thereon, substantially as and for the purpose described.

To the above I have signed my name, this 24th day of May, 1869.

ZACHARIAH B. SIMS.

Witnesses:
   JOHN A. WIEDERSHEIM,
   PHIL. F. LARNER.